US010983452B2

(12) United States Patent
Orlik et al.

(10) Patent No.: US 10,983,452 B2
(45) Date of Patent: Apr. 20, 2021

(54) METHODS OF PRINTING AND ELECTROSTATIC INK COMPOSITIONS (71) Applicant: HP Indigo B.V., Amstelveen (NL)

(72) Inventors: Fernanda Orlik, Nes Ziona (IL); Igor Shotri, Nes Ziona (IL); Albert Teishev, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 9 days.

(21) Appl. No.: 14/443,949

(22) PCT Filed: Nov. 20, 2012

(86) PCT No.: PCT/EP2012/073112
§ 371 (c)(1),
(2) Date: May 19, 2015

(87) PCT Pub. No.: WO2014/079482
PCT Pub. Date: May 30, 2014

(65) Prior Publication Data
US 2015/0338757 A1    Nov. 26, 2015

(51) Int. Cl.
G03G 9/12 (2006.01)
G03G 13/14 (2006.01)
(Continued)

(52) U.S. Cl.
CPC .............. G03G 9/12 (2013.01); C09D 11/03 (2013.01); G03G 7/008 (2013.01); G03G 9/122 (2013.01);
(Continued)

(58) Field of Classification Search
CPC ........... G03G 9/122; G03G 9/13; G03G 9/131
See application file for complete search history.

(56) References Cited

U.S. PATENT DOCUMENTS 2,976,148 A    3/1961  Walford
4,152,151 A *  5/1979  Lawson ................... G03G 9/12
                                                       430/113
(Continued)

FOREIGN PATENT DOCUMENTS

CN      1577124      2/2005
CN    101082786     12/2007
(Continued)

OTHER PUBLICATIONS

Product Sheet for Ti-Pure R104.*
(Continued)

Primary Examiner — Peter L Vajda
(74) Attorney, Agent, or Firm — Thorpe North & Western LLP (57) ABSTRACT Here is described a method of printing on a plastic substrate, the method comprising: providing an electrostatic ink composition comprising a carrier liquid, and particles comprising a resin, and a slip agent dispersed in the carrier liquid; forming a latent electrostatic image on a surface; contacting the surface with the electrostatic ink composition, such that at least some of the particles and the slip agent are transferred to the surface to form a developed toner image on the surface; and transferring the toner image to the plastic substrate. Electrostatic ink compositions and plastic substrates are also disclosed.

20 Claims, 3 Drawing Sheets (51) Int. Cl.
  *G03G 13/10*   (2006.01)
  *G03G 13/22*   (2006.01)
  *G03G 7/00*    (2006.01)
  *G03G 9/135*   (2006.01)
  *C09D 11/03*   (2014.01)

(52) U.S. Cl.
  CPC ........... *G03G 9/1355* (2013.01); *G03G 13/10* (2013.01); *G03G 13/14* (2013.01); *G03G 13/22* (2013.01); *Y10T 428/24901* (2015.01)

(56) References Cited

U.S. PATENT DOCUMENTS

| | | | |
|---|---|---|---|
| 6,245,139 B1 * | 6/2001 | Nicholls | C09D 11/36 106/31.27 |
| 6,447,973 B1 * | 9/2002 | Asami | G03G 9/125 430/114 |
| 6,680,097 B1 | 1/2004 | Amberger et al. | |
| 6,723,402 B2 | 4/2004 | Nair et al. | |
| 6,818,283 B2 | 11/2004 | Nakamura et al. | |
| 7,070,860 B2 | 7/2006 | Kobayashi et al. | |
| 2006/0251866 A1 | 11/2006 | Zhou et al. | |
| 2008/0299481 A1 | 12/2008 | Akioka | |
| 2009/0047458 A1 * | 2/2009 | Fujinaga | G03G 7/004 428/41.3 |
| 2009/0162779 A1 * | 6/2009 | Nair | C09B 67/0013 430/137.14 |
| 2009/0305160 A1 * | 12/2009 | Gal | G03G 9/122 430/112 |
| 2010/0129112 A1 | 5/2010 | Tada et al. | |
| 2011/0189606 A1 * | 8/2011 | Silcoff | G03G 9/1355 430/115 |

FOREIGN PATENT DOCUMENTS

| | | | |
|---|---|---|---|
| CN | 101178550 | 5/2008 | |
| CN | 101430513 | 5/2009 | |
| EP | 0879770 | 11/1998 | |
| JP | 2008522242 | 6/2008 | |
| JP | 4168847 | 8/2008 | |
| JP | 2008299142 | 12/2008 | |
| JP | 4762812 | 6/2011 | |
| JP | 2012181267 | 9/2012 | |
| JP | 2012220880 | 11/2012 | |
| WO | 03009064 | 1/2003 | |
| WO | 2007130069 | 11/2007 | |
| WO | 2008020925 | 2/2008 | |
| WO | 2008083820 | 7/2008 | |
| WO | 2011009488 | 1/2011 | |
| WO | 2012095361 | 7/2012 | |
| WO | 2012134457 | 10/2012 | |
| WO | WO 2012-134457 | * 10/2012 | ............... G03G 5/00 |

OTHER PUBLICATIONS

International Search Report and Written Opinion dated Aug. 1, 2013 for International Application No. PCT/EP2012/073112 filed Nov. 20, 2012, Applicant Hewlett-Packard Indigo B.V.
AIC, Specification Sheet on Stearamide.
Fine Organics on FINAWAX-S, issued Oct. 5, 2012.
Entry from ChemSpider on Stearamide, http://www.chemspider.com/Chemical-Structure.29032.html, issued Nov. 5, 2012.
Entry from Plastics Wiki on Slip agent, issued Sep. 10, 2012.
Borealis, Polymer Dictionary, Terms used in the plastic industry, http://www.borealisgroup.com/innovation/polymer-dictionary?alphaList='S', issued Sep. 10, 2012.
Entry from Wikipedia on Oleamide, http://en.wikipedia.org/wiki/Oleamide, issued Sep. 10, 2012.
Brydson, Plastics Materials, book, 1999, p. 228-229, 7th Ed., Butterworth-Heineman, Oxford, United Kingdom.

* cited by examiner

METHODS OF PRINTING AND ELECTROSTATIC INK COMPOSITIONS

BACKGROUND

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the polymers, particles, colorant, charge directors and other additives can be dispersed to form a liquid electrostatic ink or electrophotographic ink. The carrier liquids may include a mixture of a variety of different agents, such as surfactants, co-solvents, viscosity modifiers, and/or other possible ingredients.

As used herein, "electrostatic ink composition" generally refers to a ink composition in liquid form that is typically suitable for use in an electrostatic printing process, sometimes termed an electrophotographic printing process. The electrostatic ink composition may comprise chargeable particles of a resin, which may be as described herein, dispersed in a carrier liquid, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate, e.g. a plastic substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 50-400V/μm, or more, ins some examples 600-900V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

In a first aspect, there is provided a method of printing on a plastic substrate, the method comprising
providing an electrostatic ink composition comprising a carrier liquid, and particles comprising a resin, and a slip agent dispersed in the carrier liquid;
forming a latent electrostatic image on a surface;
contacting the surface with the electrostatic ink composition, such that at least some of the particles and the slip agent are transferred to the surface to form a developed toner image on the surface; and
transferring the toner image to the plastic substrate.

In a second aspect, there is provided an electrostatic ink composition comprising a carrier liquid, particles comprising a resin, and a slip agent.

In a third aspect, there is provided a plastic substrate having printed thereon an ink comprising a resin and a slip agent.

The present inventors found that some electrostatic ink compositions, when printed onto plastic sheets, particularly those for use as shrink sleeves (sometimes termed shrink wrap), had a high coefficient of friction. In some circumstances, the coefficient of friction was too high for some automatic packaging operations. The present inventors have found that the coefficient of friction of printed electrostatic inks can be reduced by including a slip agent into the inks before printing, without the print quality or electrostatic printing processes being adversely affected.

In some examples, the slip agent is an agent which, after printing of the ink, effects a decrease over time of the coefficient of friction of the printed ink. In some examples, the slip agent is a non-ionic compound. In some examples, the slip agent is selected from: (a) esters, amides, alcohols and acids of oils, which may be selected from aromatic or aliphatic hydrocarbon oils, which may be selected from mineral oils, naphthenic oils and paraffinic oils; natural oils such as castor, corn, cottonseed, olive, rapeseed, soybean, sunflower, other vegetable and animal oils, and so on; and functionalized derivatives of these oils, which may be selected from, for example, polyol esters of monocarboxylic acids such as glycerol monostearate, pentaerythritol monooleate, saturated and unsaturated fatty acid amides or ethylenebis(amides), such as oleamide, erucamide, linoleamide, and mixtures thereof, glycols, polyether polyols like Carbowax, and adipic acid and sebacic acid; (b) fluoro-containing polymers such as polytetrafluoroethylene, fluorine oils, fluorine waxes and so forth; and (c) silicon compounds such as silanes and silicone polymers, including silicone oils, polydimethylsiloxane, and amino-modified polydimethylsiloxane.

In some examples, the slip agent is selected from a fatty amide and a castor oil derivative.

In some examples, the slip agent is selected from a fatty amide of the formula (I) and a fatty amide of the formula (II)

$$R^1C(O)NHR^2 \qquad (I),$$

wherein $R^1$ is an optionally substituted hydrocarbon group having at least 7 carbon atoms and $R^2$ is selected from hydrogen and an optionally substituted hydrocarbon group having at least 7 carbon atoms, $$R^3C(O)NHCH_2CH_2NHC(O)R^4 \qquad (II),$$

wherein each of $R^3$ and $R^4$ is independently an optionally substituted hydrocarbon group having at least 7 carbon atoms.

In some examples, in formula (I), $R^1$ is an optionally substituted hydrocarbon group having from 7 to 30 carbon atoms, in some examples from 10 to 26 carbon atoms, in some examples from 10 to 22 carbon atoms and $R^2$ is selected from hydrogen and an optionally substituted hydrocarbon group having from 7 to 30 carbon atoms, in some examples from 10 to 26 carbon atoms, in some examples from 10 to 22 carbon atoms. In some examples, the slip agent is selected from palmitamide, stearamide, arachidamide, behenamide, oleamide, erucamide, linoleamide, stearyl stearamide, palmityl palmitamide and stearyl arachidamide. An example of a commercially available slip agent of formula (I) is Finawax S70, available commercially from Fine Organic, India.

In some examples, in formula (II), each of $R^3$ and $R^4$ is independently an optionally substituted hydrocarbon group having at least 7 carbon atoms, in some examples from 10 to 26 carbon atoms, in some examples from 10 to 22 carbon atoms.

In some examples, in formula (I), $R^1$ is an optionally substituted alkyl group having from 7 to 30 carbon atoms, in some examples from 10 to 26 carbon atoms, in some examples from 10 to 22 carbon atoms and $R^2$ is selected from hydrogen and an optionally substituted alkyl group having from 7 to 30 carbon atoms, in some examples from 10 to 26 carbon atoms, in some examples from 10 to 22 carbon atoms.

In some examples, each of $R^3$ and $R^4$ is independently an optionally substituted alkyl group having at least 7 carbon atoms, in some examples from 10 to 26 carbon atoms, in some examples from 10 to 22 carbon atoms. In some examples, the slip agent is selected from stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide and palmitamidoethyloleamide. An example of commercially available slip agents of the formula (II) include Finawax C and Finawax VL, both of which are available from Fine Organic, India.

In some examples, the slip agent comprises an organic wax. In some examples, the organic wax is of natural origin, and in some examples comprises a vegetable wax. In some examples, the slip agent may comprise a castor wax or hydrogenated castor oil derivative, such as hydrogenated castor oil triglyceride.

In some examples, the slip agent may comprise a vegetable wax, such as castor oil derivative, that is of the triglyceride type. In some examples, the slip agent may comprise a vegetable wax, such as a castor oil derivative, having a bulky molecular structure wax with larger intermolecular spacing as compared to PE-based waxes. In some examples, the slip agent may comprise a vegetable wax, such as a castor oil derivative, having a melting range of about 50 to 80° C.

In some examples, the slip agent comprises a castor oil derivative of formula (III)

(III)

In some examples, the slip agent comprises a castor oil derivate having a molecular weight of from about 900 to about 960, in some examples of from about 920 to about 940, such as about 940.

In some examples, the slip agent comprises a castor oil derivate having a hydroxyl number of from about 140 to about 170, in some examples from about 145 to about 165, or about 160 or about 158.

In some examples, the slip agent comprises a castor oil derivate having a saponification number of from about 170 to about 190, in some examples from about 175 to about 185 or about 180.

In some examples, the slip agent comprises a castor oil derivate having a melting point of from about 80 to about 95° C., in some examples from about 83-90° C., or about 85° C. or about 86° C.

An example of a castor oil derivate for use in the electrostatic ink composition is the commercially available SiberFlowC85 from DKSH.

In some examples, the slip agent constitutes from about 1 wt % to about 6 wt % of the solids content of electrostatic ink composition. In some examples, the slip agent constitutes from about 1 wt % to about 5 wt % of the solids content of electrostatic ink composition. In some examples, the slip agent constitutes from about 1 wt % to about 3 wt % of the solids content of the electrostatic ink composition. In some examples, the slip agent constitutes from about 1.5 wt % to about 3 wt % of the solids content of the electrostatic ink composition. In some examples, the slip agent constitutes from about 1.5 wt % to about 2.5 wt % of the solids content of the electrostatic ink composition, or in some examples about 2.5 wt % to about 3.5 wt % of the solids content of the electrostatic ink composition. In some examples, the slip agent constitutes from about 2 wt % or about 3 wt % of the solids content of the electrostatic ink composition.

In some examples, the electrostatic ink composition comprises a carrier liquid. In some examples, the particles comprising a resin and a slip agent, are suspended or dispersed in the carrier liquid. Generally, the carrier liquid can act as a dispersing medium for the other components in the electrostatic ink. For example, the carrier liquid can comprise or be a hydrocarbon, silicone oil, vegetable oil, etc. The carrier liquid can include, but is not limited to, an insulating, non-polar, non-aqueous liquid that is used as the medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid can constitute about 20% to 99.5% by weight of the electrostatic ink composition, in some examples 50% to 99.5% by weight of the electrostatic ink composition. The carrier liquid may constitute about 40 to 90% by weight of the electrostatic ink composition. The carrier liquid may constitute about 60% to 80% by weight of the electrostatic ink composition. The carrier liquid may constitute about 90% to 99.5% by weight of the electrostatic ink composition, in some examples 95% to 99% by weight of the electrostatic ink composition.

The electrostatic ink, when printed on the plastic substrate, may be substantially free from carrier liquid. In an electrostatic printing process and/or afterwards, the carrier liquid may be removed, e.g. by an electrophoresis processes during printing and/or evaporation, such that substantially just solids are transferred to a substrate, e.g. the plastic substrate. Substantially free from carrier liquid may indicate that the ink printed on the plastic substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the plastic substrate is free from carrier liquid.

The resin in the electrostatic ink composition and/or the ink printed on the plastic substrate can comprise a polymer including, but not limited to, a thermoplastic polymer. A thermoplastic polymer is sometimes referred to as a thermoplastic resin. In some examples, the polymer may be selected from ethylene or propylene acrylic acid co-polymers; ethylene or propylene methacrylic acid co-polymers; ethylene or propylene acrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition comprises a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™ Nucrel 609HS™, Nucrel 908HS™, Nucrel 1202HC™, Nucrel 30707™ Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the electrostatic ink composition and/or the ink printed on the plastic substrate. The resin can constitute about 60 to 95%, in some examples about 70 to 95%, by weight of the solids of the electrostatic ink composition and/or the ink printed on the plastic substrate.

The electrostatic ink composition and/or ink printed on the plastic substrate can comprise a charge director. A charge director can be added to an electrostatic ink composition to impart a charge of a desired polarity and/or maintain sufficient electrostatic charge on the particles of an electrostatic ink composition. The charge director may comprise ionic compounds, including, but not limited to, metal salts of fatty acids, metal salts of sulfo-succinates, metal salts of oxy-phosphates, metal salts of alkyl-benzenesulfonic acid, metal salts of aromatic carboxylic acids or sulfonic acids, as well as zwitterionic and non-ionic compounds, such as polyoxy-ethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula [$R_a$—O—C(O)$CH_2$CH($SO_3^-$)OC(O)—O—$R_b$], where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula [$R_a$—O—C(O)$CH_2$CH($SO_3^-$)OC(O)—O—$R_b$], where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, Al $(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula [$R_a$—O—C(O)$CH_2$CH($SO_3^-$)OC(O)—O—$R_b$], in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula [$R_a$—O—C(O)$CH_2$CH($SO_3^-$)OC(O)—O—$R_b$] and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

The charge director can constitute about 0.001% to 20%, in some examples 0.01 to 20% by weight, in some examples 0.01 to 10% by weight, in some examples 0.01 to 1% by weight of the solids of the electrostatic ink composition and/or ink printed on the plastic substrate. The charge director can constitute about 0.001 to 0.15% by weight of the solids of the electrostatic ink composition and/or ink printed on the plastic substrate, in some examples 0.001 to 0.15%, in some examples 0.001 to 0.02% by weight of the solids of the electrostatic ink composition and/or ink printed on the plastic substrate. In some examples, the charge director imparts a negative charge on the electrostatic ink composition. The particle conductivity may range from 50 to 500 pmho/cm, in some examples from 200-350 pmho/cm.

The electrostatic ink composition and/or ink printed on the plastic substrate can include a charge adjuvant. A charge adjuvant may be present with a charge director, and may be different to the charge director, and act to increase and/or stabilise the charge on particles, e.g. resin-containing particles, of an electrostatic ink composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminum di and/or tristearate and/or aluminum di and/or tripalmitate.

The charge adjuvant can constitute about 0.1 to 5% by weight of the solids of the electrostatic ink composition and/or ink printed on the plastic substrate. The charge adjuvant can constitute about 0.5 to 4% by weight of the solids of the electrostatic ink composition and/or ink printed on the plastic substrate. The charge adjuvant can constitute about 1 to 3% by weight of the solids of the electrostatic ink composition and/or ink printed on the plastic substrate.

The electrostatic ink composition and/or ink printed on the plastic substrate may further comprise a colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. The electrostatic ink composition and/or ink printed on the plastic substrate may comprise a plurality of colorants. The electrostatic ink composition and/or ink printed on the plastic substrate may comprise a first colorant and second colorant, which are different from one another. Further colorants may also be present with the first and second colorants. The electrostatic ink composition and/or ink printed on the plastic substrate may comprise first and second colorants where each is independently selected from a cyan colorant, a yellow colorant, a magenta colorant and a black colorant. In some examples, the first colorant comprises a black colorant, and the second colorant comprises a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

In some examples, the electrostatic ink composition comprises a white colorant.

In some examples, the white colorant is selected from $TiO_2$, calcium carbonate, zinc oxide, and mixtures thereof. In some examples, the electrostatic ink composition comprises a white colorant selected from rutile, anatase, and brookite, and mixtures thereof. In some examples, the electrostatic ink composition comprises a white colorant in the form of rutile. The rutile form of $TiO_2$ exhibits the highest refractive index among the other forms of $TiO_2$ and the other listed pigments. All other parameters of inks being the same, the highest refractive index yields the highest opacity.

In some examples, the electrostatic ink composition or the electrostatic ink lacks a colorant. In some examples, the electrostatic ink composition or the electrostatic ink lacks inorganic particulate material. In some examples, the electrostatic ink composition or the electrostatic ink is substantially transparent when printed.

The colorant, e.g. the white colorant, may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples the colorant, e.g. the white colorant, may constitute from 1 wt % to 50 wt % of the solids of the electrostatic ink composition, in some example from 5 wt % to 40 wt % of the solids of the electrostatic ink composition, in some examples from 20 wt % to 40 wt % of the solids of the electrostatic ink composition, in some examples 25 wt % to 35 wt % of the solids of the electrostatic ink composition.

In some examples, there is provided a method of manufacturing an electrostatic ink composition, the method comprising mixing the particles comprising a resin and a slip agent and the carrier liquid. In some examples, the method involves mixing a resin, which may be as described herein, and a slip agent, in some examples in the presence of the carrier liquid, under shear conditions to produce particles comprising the resin and the slip agent. In some examples, "particles comprising a resin and a slip agent" may indicate that the resin and slip agent are in different particles or in the same particles. In some examples, "particles comprising a resin and a slip agent", indicates that at least some, in some examples all, of the particles comprise both the resin and the slip agent. The shear conditions may involve grinding the resin and the slip agent, e.g. in a ball mill or a grinder, which may be in the presence of a carrier liquid. In some examples the resin and carrier liquid are mixed under shear conditions to product particles comprising the resin dispersed in the carrier liquid, and a composition comprising the slip agent, which may be in particulate form, in some examples with one or more additives, such as a charge adjuvant, is added to the carrier liquid comprising the particles comprising the resin.

In some examples, the method of manufacturing may comprise mixing a resin, the slip agent and a carrier liquid under appropriate conditions, to form particles comprising the resin and the slip agent, that are suspended within the carrier liquid, and, in some examples, mixing a charge director with the carrier liquid. One or more further additives as described herein may be added at any time during the method. The steps described above are not intended to be bound by any particular order. For example, the mixing of the resin with the carrier liquid may be performed before, after, or concurrently with the step of combining the charge director with the carrier liquid. Additionally, the steps may be combined or performed in a different order. Additionally, the steps may include other processing steps. In some examples, the step of combining the slip agent with the resin can include grinding the resin and the slip agent, which may form particles comprising the resin and the slip agent.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles, e.g. comprising a resin and the graft co-polymer comprising an acrylate polymer backbone onto which has been grafted polysiloxane side chains, adhere to the surface of the rotating member.

The intermediate transfer member, if present, may be a rotating flexible member, which may be heated, e.g. to a temperature of from 80 to 160° C.

A plastic substrate may be a substrate comprising plastic. The plastic substrate is, in some examples, a substrate comprising, consisting essentially of or consisting of plastic. A substrate consisting essentially of plastic may comprise at least 90 wt % plastic, in some examples at least 95 wt % plastic, in some examples at least 98 wt % plastic, in some examples at least 99 wt % plastic.

In some examples, the plastic substrate has a primer on a surface onto which the electrostatic ink is printed. In some examples, the primer may be selected from a polyacrylic acid polymer, for example, a polyacrylic acid copolymer. In some examples, the polyacrylic acid polymer may comprise an ethylene acrylic acid copolymer. The primer may include another polymeric component, for example, a polyethylene polymer, or any other suitable polymer. The primer also may include a non-polymeric component, for example, silica, wax, and/or talc. In some examples, the primer may comprise a blend of a polyacrylic acid polymer and, in some examples, a non-polymeric component, for example, silica, wax, and/or talc. In some examples, the primer may comprise a blend of a polyacrylic acid polymer, a polyethylene polymer, and, in some examples, a non-polymeric component, for example, silica, wax, and/or talc. In another example, the primer may comprise a blend of a polyacrylic acid polymer and a polyethylene polymer.

Some examples of materials that may be suitable for use in the primer include DIGIPRIME 4500 primer (available from Michelman, Inc., Cincinnati, Ohio) and DIGIPRIME 4501 (available from Michelman, Inc., Cincinnati, Ohio), both of which are believed to comprise at least one polyacrylic acid polymer, for example, a polyacrylic acid copolymer, such as an ethylene acrylic acid copolymer. It is also believed that DIGIPRIME 4500 primer and/or DIGIPRIME 4501 primer may include one or more non-polymeric components, for example, silica, wax, and/or talc.

In some examples, the plastic substrate is or comprises a sheet of plastic, which, in some examples, has a primer on a surface thereof, onto which the electrostatic ink is printed. The sheet of plastic may be a continuous sheet. The sheet of plastic may be a non-porous sheet of plastic. At least part of the sheet of plastic may be wound onto a roll.

The plastic substrate may comprise a plastic for use as a shrink sleeve or shrink wrap material. In some examples, the substrate comprises a sheet of plastic for forming into a shrink sleeve or in the form of a shrink sleeve. Shrink sleeve or shrink wrap material is material that, in an expanded state, for example in a stretched state, will contract upon the application of heat. In use, before or after printing the ink on the shrink sleeve or shrink wrap, the shrink sleeve can put over the container in an expanded state. Heat can then be applied, such that the material of the shrink sleeve or shrink wrap contracts, gripping the container it surrounds. The plastic substrate, if it comprises or is a plastic for use as a shrink sleeve may be or comprise a monoaxially stretched or biaxially stretched plastic. In some examples, the plastic substrate may comprise a single layer of material, which may comprise or be plastic, or a plurality of layers of material, each of which may comprise or be plastic, and may be different to one another. In some examples, the plastic substrate may be in the form of a sleeve, in some examples a shrink sleeve, which may be in an expanded or contracted state, and may or may not wrap an object, such as a container.

In some examples, the plastic substrate is in the form of a sheet, in some examples a sheet of plastic, having a thickness of at least 5 µm, in some examples at least 10 µm, in some examples at least 30 µm, in some examples at least 40 µm. In some examples, the plastic substrate is in the form of a sheet having a thickness of from 5 µm to 1 mm, in some examples 5 µm to 200 µm, in some examples 5 µm to 100 µm, in some examples 10 µm to 80 µm, in some examples 10 µm to 60 µm, in some examples 20 µm to 60 µm, in some examples 30 µm to 50 µm, in some examples 35 µm to 45 µm.

In some examples, the plastic substrate comprises a plastic, which may be a plastic for forming a shrink sleeve, selected from a polyalkylene, polyethylene terephthalate, polyethylene terephthalate glycol, polystyrene, polyvinyl chloride, polyethylene-2,6-napthalate, polyhexamethylene adipamide, polymers of alpha mono-olefinically unsaturated hydrocarbons having polymer producing unsaturation such as butene, vinyl acetate, methylacrylate, 2-ethyl hexyl acrylate, isoprene, butadiene acrylamide, ethylacrylate and N-methyl-n-vinyl acetamide. In some examples, the plastic substrate comprises a plastic, which may be a plastic for forming a shrink sleeve, selected from polyethylene, polypropylene, polyisopropylethylene and polyisobutylethylene.

In some examples, the plastic substrate comprises a monoaxially or biaxially oriented sheet of plastic. In some examples, the substrate comprises a plastic selected from an oriented polypropylene and an oriented polyethylene. In some examples, the plastic of the plastic substrate is selected from monoaxially oriented polypropylene, biaxially oriented polypropylene, monoaxially oriented polyethylene and biaxially oriented polyethylene.

In some examples, the plastic substrate may or may not be associated with or in contact with a paper substrate.

As mentioned, the present disclosure also relates to a plastic substrate having printed thereon an ink comprising a resin and a slip agent. The plastic substrate may have had a primer applied to a surface, and the ink comprising the resin and the slip agent printed on the primer. The plastic substrate may have primer disposed between the plastic of the substrate and the ink comprising the resin and the slip agent.

EXAMPLES

The following illustrates examples of the methods, compositions and other aspects described herein. Thus, these examples should not be considered as limitations of the present disclosure, but are merely in place to teach how to make examples of compositions of the present disclosure.

In the following examples, the slip agents shown in Table 1 are used and referred to.

TABLE 1

| Code | Chemistry | Trade name and Source of Slip Agent | Melting Point | Swelling % (sol-L) | Solubility (NVS % in Sol-L) |
| --- | --- | --- | --- | --- | --- |
| C85 | Castor Oil Derivative | SiberFlow C85 (DSKH) | 85° C. | 10 | 1.91 |
| FX-C | Secondary Fatty Amide Ethylene Bis stearamide | Finawax C (Fine Organic, India) | 140° C. | | |
| FX-S | Fatty Amide (Stearamide) | Finawax S70 (Fine Organic, India) | 100-110° C. | 5 | 0.3 |
| FX-VL | Secondary Fatty Amide (Ethylene Bis oleamide) | Finawax VL (Fine Organic, India) | 115° C. | 3.1 | 1.7 |

Example 1

A fatty acid amide [FX-C] was incorporated into a white ink during the ink grinding process to produce a high-slip white ink. The process was that the following components:
- 466.3 g of resin paste (mixture of 69.5% isopar-L; 20.5% Nucrel 925 [DuPont]; 7.9% Nucrel 699 [DuPont]; and 3.1% A-C 5120 [Honeywell]);
- 146.9 g of white pigment [Kronos 2073 (Kronos)];
- 6.12 g of Finawax C [Fine Organic, India]; and
- 1080.7 g of isopar-L [Exxon, Israel]

were ground using a Szegvari Attrition System (Union Process) [size 1] together with ceramic ball mills, for 12 hours at 40° C., and at a rotor speed of 250 rpm.

Having measured the percentage solids in the ink, a working solution of the ink was then prepared by diluting it with isopar L, to produce 3500 g of a 3% NVS solution.

Example 2

A fatty acid amide [FX-S] was ground and then mixed with a White Plus HP Electroink™ to produce a high-slip White Plus HP Electroink™. The process was that the following components were combined to form a wax slurry:
- 40.32 g of Finawax S70 [Fine Organics, India];
- 1.4 g of aluminum stearate [Sigma-Aldrich, Israel]; and
- 108.28 g of isopar L [Exxon, Israel].

This wax slurry was then ground using a Szegvari Attrition System (Union Process) [size 01] together with stainless steel ball mills, for 2 hours at 15° C., and at a rotor speed of 250 rpm.

50 g of the resulting slurry was then mixed very well with 1.5 Kg of White Plus HP Electroink™ (the whole content of a large cartridge), using a Kenwood mixer at low speed. Having measured the percentage solids in the ink, a working solution of the ink was then prepared by diluting it with isopar L, to produce 3500 g of a 3% NVS solution.

Example 3a

A fatty acid amide [FX-C] was incorporated into a transparent ink during the ink grinding process to produce a high-slip transparent ink. The process was that the following components:
- 1616.26 g of resin paste (mixture of 75% isopar-L; 20% Nucrel 699 [DuPont]; and 5% A-C 5120 [Honeywell]);
- 580 g of aluminium stereate [Sigma-Aldrich, Israel];
- 8.18 g Finawax C [Fine Organic, India]; and
- 669.66 g of isopar-L [Exxon, Israel]
0.037%
were ground in a Szegvari Attrition System (Union Process) size 1 together with ceramic ball mills for 12 hours at a temperature of 30° C. and at rotor speed of 250 rpm. After the this period, remove the ink by adding isopar L if desired.

Example 3b

A transparent ink was produced in the same manner as Example 3a, except that the C85 additive was used in place of the FX-C additive Example 4

Fatty Acid Amide Slurry Mixed with Transparent Ink

Ink Formulation
- 927 g of resin paste (mixture of 66% isopar L; 44% Nucrel 925, DuPont)
- 5.8 g aluminium stereate (Sigma-Aldrich, Israel)
- 661.39 g of isopar L (Exxon, Israel)

Ink Grinding Process
Add components to a Szegvari Attrition System (Union Process) size 1 together with ceramic ball mills.
Set time: 12 h
Set temperature: 30° C.
Rotor speed: 250 rpm
After the desired period, remove the ink by adding isopar L if needed Additive Preparation:
Wax Slurry Formulation:
- 40.32 g of SiberFlow C85 (DSKH)
- 1.4 g of aluminum stearate (Sigma-Aldrich, Israel)
- 108.28 g of isopar L (Exxon, Israel)

Wax Slurry Preparation:
Grind the SiberFlow C85 granules with a coffee grinder for 15 min. The mix the powder with the rest of the formulation components and add to a Szegvari Attrition System (Union Process) size 01 together with stainless steel ball mills.
Set time: 2 h
Set temperature: 15° C.
Rotor speed: 250 rpm
After the desired period, remove the slurry and keep.

Low COF Transparent Ink Preparation:
Mix very well 1 kg of transparent ink with 66 g of SiberFlow C85 wax slurry using a Kenwood mixer at low speed.
Use this ink to fill a new ink cartridge and to prepare working solutions Preparation of Working Solution:
measure percent of solids of the ink
prepare 3500 g of a 2% NVS solution by diluting with isopar-L Comparative Example 5

HP White Electroink for HP Indigo 6×00 series was used as a comparative example.

Testing the Examples

Each of the inks of Examples 1 2, 3, 4 and 5 were then printed onto BOPP 40 μm transparent substrate using an HP Indigo 6600 press, set to print on either 5 positions (YMCK+W) or 6 positions (WYMCK+T), where the white (W) or transparent (T) (as required) was the working solution of the examples, used with a new BID, tank and pumps. When a reference transparent ink was tested, i.e. without a slip agent, an HP Indigo 6×00 series (Electroink™) white ink was used (Comparative Example 5 above). A new blanket and PIP were also used for each test. Where applicable, a conductivity (LF) of 90 μmho and density of 1.7 units were set for the transparent inks.

Table 1 below indicates the inks printed for the tests involving the white inks (Example 2). The related print procedure is given below this table. Table 2 below indicates the inks printed for the tests involving the transparent inks (Examples 3, 4 and 5). Again, the related print procedure is given below this table.

TABLE 1

| | | separations ( order ---> ) | | | | |
|---|---|---|---|---|---|---|
| job order | job name | W | Y | M | C | K |
| 1 | gray 60 | | 1 | 1 | 1 | 1 |
| 2 | cleaner page | | 2 | | | |
| 3 | yellow 4.5 (Y-->W) | 1 | | 1 | 1 | 1 |
| 4 | K100W100 | 1 | | | | 1 |
| 5 | KY100W100 | 1 | 1 | | | 1 |
| 6 | KYM100W100 | 1 | 1 | 1 | | 1 |
| 7 | KYMC100W100 | 1 | 1 | 1 | 1 | 1 |

W in the above table indicates the ink of Example 2. Y, M, C and K indicate, respectfully, yellow, magenta, cyan and black inks.

Procedure
A) Blanket and PIP conditioning
  a. Perform first transfer (T1) wizard procedure, to adjust pressure of the first transfer
  b. Perform a color calibration sometimes referred to as 'CA'
  c. Run 2 k impressions of gray 60
  d. Print 5 copies of print cleaner ('cleaner page' in table above)

1. New INK name: White plus+3% FXS70 (Example 2)
   1.1. Ink building
      1.1.1. Replace white ink tank (keep jerican aside)
      1.1.2. Add white with FXS70 working solution (i.e. Example 2)
      1.1.3. Add conductivity until set point of LF=90 μmho reached (i.e. adding charge director, which was the commercially available HP Imaging Agent, until a LF of 90 pmho was reached)

LF indicates Low Field conductivity. Low field conductivity is measured by applying a constant amplitude AC voltage to two parallel electrodes and monitoring the current via the fluid—in this instance, the electric field amplitude was 5 V/mm, frequency was 5 Hz, and the temperature was 23° C.

4.1. Print:
      4.1.1. Mark film with sticker: start White plus+FXS70
      4.1.2. 5 copies of Yellow4.5 (White)
      4.1.3. 5 copies of K100W100
      4.1.4. 5 copies of KY100W100
      4.1.5. 5 copies of Yellow4.5 (White)
      4.1.6. 5 copies of KYM100W100
      4.1.7. 5 copies of KYMC100W100
      4.1.8. 5 copies of Yellow4.5 (White)
      4.1.9. 5 copies of cleaner page (or more if blanket is not cleaned)
      4.1.10. Cut roller and keep aside.
   4.2. Remove ink:
      4.2.1. Remove ink from tank. Keep it in jerican
      4.2.2. Mark jerican as PRINTED and DATE
      4.2.3. Clean ink tank, BID and piping, Use OFIR C) New INK name: F:Ace+2% Finawax C (Example 3a)
   a. Replace ink tank
   b. Set density to 1.7
   c. Add conductivity until LF=90 μmho (i.e. adding charge director, which was the commercially available HP Imaging Agent until a LF of 90 μmho was reached)

LF indicates Low Field conductivity. Low field conductivity is measured by applying a constant amplitude AC voltage to two parallel electrodes and monitoring the current via the fluid—in this instance, the electric field amplitude was 5 V/mm, frequency was 5 Hz, and the temperature was 23° C.

Print:
   d. Mark film with sticker: start F:Ace+2% Finawax C W100
   e. 10 copies of White (i.e. ink from comparative example 5)
   f. 10 copies of DM (transparent ink, i.e. the ink of Example 3a)
   g. 10 copies of K10056100
   h. 10 copies of KY10056100
   i. 10 copies of KYM10056100
   j. 10 copies of KYMC10056100
   k. Mark film with sticker: end F:Ace+2% Finawax C W100
   l. Mark film with sticker: start F:Ace+2% Finawax C W200
   m. 10 copies of K10056100W2
   n. 10 copies of KY10056100W2
   o. 10 copies of KYM10056100W2
   p. 10 copies of KYMC10056100W2
   q. Mark film with sticker: end F:Ace+2% Finawax C W200
   r. 5 copies of cleaner page (or more if blanket is not cleaned)
   s. Cut roller and keep aside.

Remove Ink:
   a. Remove ink from tank. Keep it in jerican
   b. Mark jerican as PRINTED and DATE
   c. Clean ink tank, BID and piping, Use OFIR

TABLE 2

| job order | job name | separations (order --->) | | | | | |
| --- | --- | --- | --- | --- | --- | --- | --- |
| | | DM | W | Y | M | C | K |
| 1 | gray 60 | | | 1 | 1 | 1 | 1 |
| 2 | cleaner page | | 2 | | | | |
| 3 | white | | 1 | | 1 | 1 | 1 |
| 4 | D.M | 1 | | | 1 | 1 | 1 |
| 5 | K10056100 | 1 | 1 | | | | 1 |
| 6 | KY10056100 | 1 | 1 | 1 | | | 1 |
| 7 | KYM10056100 | 1 | 1 | 1 | 1 | | 1 |
| 8 | KYMC10056100 | 1 | 1 | 1 | 1 | 1 | 1 |
| 9 | K10056100W2 | 1 | 2 | | | | 1 |
| 10 | KY10056100W2 | 1 | 2 | 1 | | | 1 |
| 11 | KYM10056100W2 | 1 | 2 | 1 | 1 | | 1 |
| 12 | KYMC10056100W2 | 1 | 2 | 1 | 1 | 1 | 1 |
| 13 | cleaner pager | | 2 | | | | |

W in the above table indicates White Plus HP Electroink™. Y, M, C and K indicate, respectfully, yellow, magenta, cyan and black inks. DM in the separations indicates the ink of Example 3 (run using Digital Matte Electroink ink file parameter).

Procedure

B) Blanket and PIP conditioning
   a. Perform first transfer (T1) wizard procedure, to adjust pressure of the first transfer
   b. Perform a color calibration sometimes referred to as 'CA'
   c. Run 2 k imp of gray 60
   d. Print 5 copies of print cleaner (i.e. 'cleaner page' in table above)

Measuring the Coefficient of Friction

Figure 1:
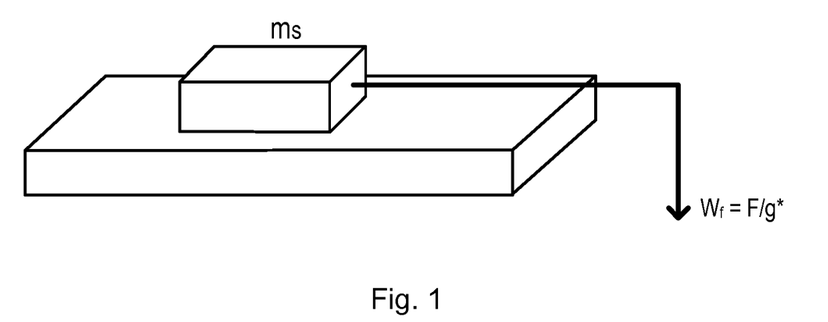
FIG. 1 illustrates schematically an example of an apparatus for use in testing the coefficient of friction of inks printed onto substrates.

The coefficient of friction (COF) of the printed inks was then measured by a simple weight ratio method [Wf/ms] (using apparatus shown schematically in FIG. 1) at various times after printing. The standard test method for testing COF is ASTM1894. This method covers the measurement of static COF, which is related to the force required to begin movement of the surfaces relative to each other, and kinetic COF, which is related to the force required to sustain the movement. Film-to-film values are measured by attaching a film to a stationary sled (a 200 gram weight in the ASTM1894 test, although the present inventors used a heavier sled), and attaching another film to a moving plane. These two films are then pulled across each other at a specified rate (15 cm/s or about 6 inches/min). The force measured (in grams) is then divided by the weight of the sled to yield a dimensionless number between 0.0 and 1.0. In the set-up used to test the coefficient of friction of these examples, the sled weight was 790 g and the speed 15 cm/s. Films were placed on blanket release surfaces to avoid sliding.

Figure 2:
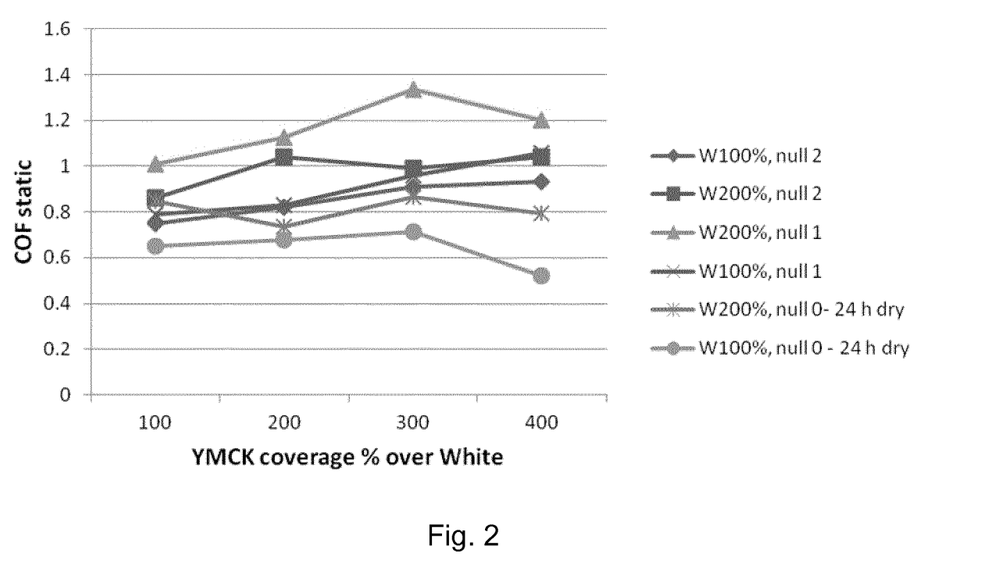
FIG. 2 shows the change in coefficient of friction against print coverage for certain inks, as described in the Examples below.

FIG. 2 shows the change in coefficient of friction against print coverage, for the ink of comparative Example 5 printed using the print jobs described above. The coefficient of friction clearly increases with increasing print coverage percent. The codes in the figure indicate the coverage of white ink, W100 refers to one hit of solid white, while W200 refers to 2 hits of solid white. Null cycles amount varies from 0 to 2 and are applied after the last hit of white. Nulls were applied in order to dry the white ink layer (a null cycle is a rotation of the blanket against the PIP without transfer of ink).

Figure 3:
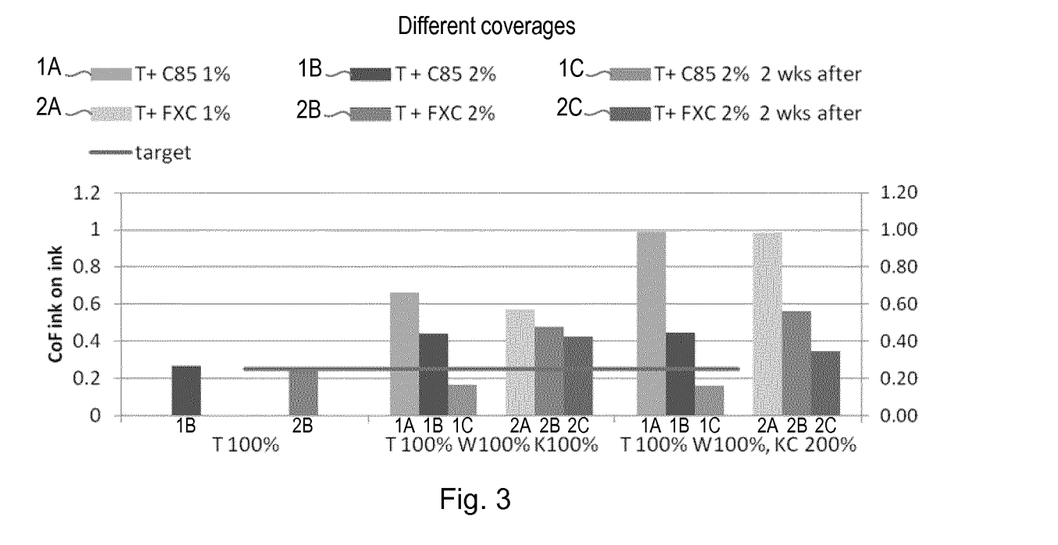
FIG. 3 shows the coefficients of friction for certain inks measured for different print coverages, at two different times after printing, as described in the Examples below.

FIG. 3 shows the coefficients of friction measured for different print coverages, at two different times after printing, for the ground ink of Example 3a (marked in this Figure as T+FXC) and an analogous example ink made using equivalent amounts of another slip agent, C85 (Example 3b, marked in this Figure as T+C85). These are measured for compositions containing comprising both 1% and 2% slip agent. The codes used are shown in Table 1. Nomenclature: T means transparent ink (i.e. Example 3a or 3b, depending on the additive), T100% refers to a 100% solid transparent ink, W100% refers to one hit of solid white, W200% refers to 2 hits of solid white, and KC200% refers to black and cyan inks respectively—printed solids of each one.

As shown in FIG. 3, for high coverages, it takes time for the slip agent to migrate to the print surface.

Figure 4:
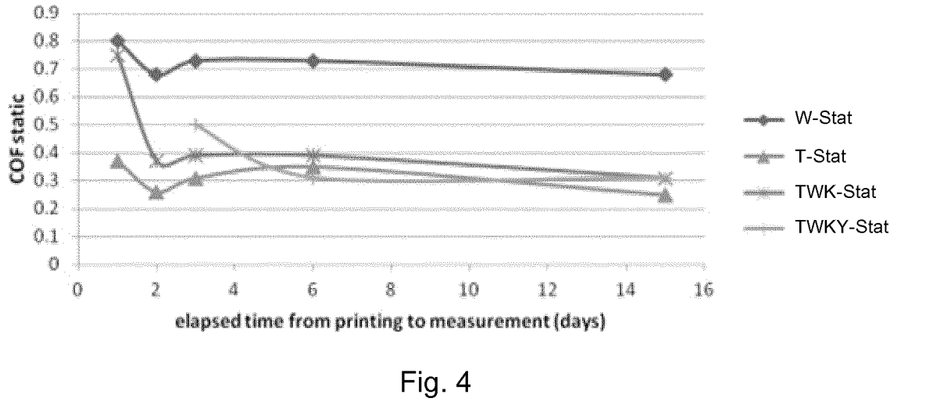
FIGS. 4 and 5 show the static and dynamic coefficients of friction (respectively) measured over 15 days, for certain inks, as described in the Examples below.
Figure 5:
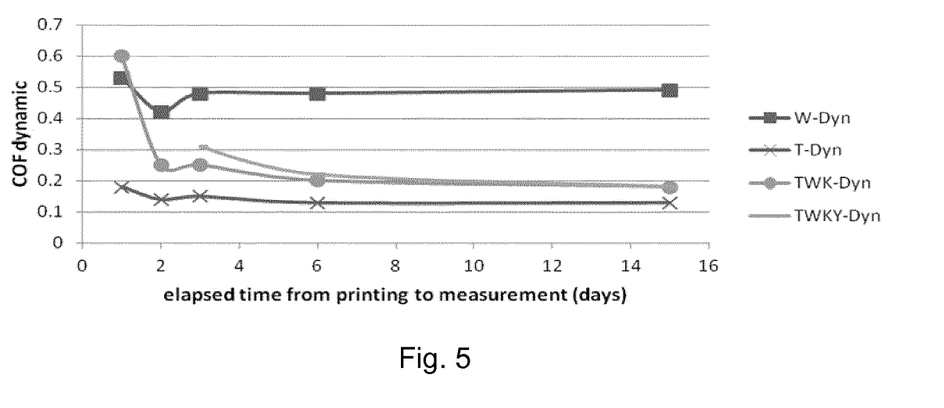

FIGS. 4 and 5 show the static and dynamic coefficients of friction (respectively) measured over 15 days for the printed inks of Example 4. In these figures, W indicates a reference ink, Comparative Example 5, T indicates the ink of Example 4, TWK indicates the combination of the ink of Example 4, White Plus HP Electroink™, and a black ink, and TWKY indicates the combination of the ink of Example 4, White Plus HP Electroink™, a black ink and a yellow ink.

The coefficients of friction measured after one day and five days for the slurry-mixed ink of Example 2 (3% FX-S) versus the commercially available White Plus HP Electroink™ are shown in Table 2. Table 2 also shows coefficients of friction measured after one day and five days for the slurry-mixed ink of Example 2, except that an equivalent amount of an alternative slip agent (FX-VL) is used.

TABLE 2

| COF static | 1 day | | 5 days | |
|---|---|---|---|---|
| | W100% | WK200% | W100% | WK200% |
| White Plus HP Electroink ™ | 0.8 | 1.05 | | |
| 3% FX-S (Example 2) | 0.39 | 0.4 | 0.32 | 0.39 |
| 3% FX-VL (same as Example 2, except FX-VL used in place of FX-S) | 0.18 | 0.31 | 0.07 | 0.19 |

The static and dynamic coefficients of friction for the slurry-mixed ink of Example 2 (3% FX-S) versus those for the commercially available White Plus HP Electroink™ are shown in Table 3. Table 3 also shows the static and dynamic coefficients of friction for two other slurry-mixed inks prepared in the same manner as those of Example 2, except that two alternative slip agents (FX-LV and C85) were used.

TABLE 3

| | Sprite Job PVC optimized | |
|---|---|---|
| | COF stat | COF dyn |
| White Plus HP Electroink ™ | 0.82 | 0.73 |
| 3% slurry of FX-S (Example 2) | 0.31 | 0.25 |

TABLE 3-continued

| | Sprite Job PVC optimized | |
|---|---|---|
| | COF stat | COF dyn |
| 2% slurry of FX-VL (same as Example 2, except FX-VL used in place of FX-S) | 0.06 | 0.01 |
| 3% slurry of C85 (same as Example 4 | 0.26 | 0.25 |

While the compositions, methods and related aspects have been described with reference to certain examples, those skilled in the art will appreciate that various modifications, changes, omissions, and substitutions can be made without departing from the spirit of the disclosure. It is intended, therefore, that the compositions, methods and related aspects be limited by the scope of the following claims. The features of any dependent claim may be combined with the features of any of the independent claims or other dependent claims.

The invention claimed is:

1. A method of printing on a plastic substrate, the method comprising
providing an electrostatic ink composition comprising a carrier liquid and particles, wherein the particles comprise both a resin and a castor oil derivative slip agent together in the same particles, wherein the particles are dispersed in the carrier liquid, wherein the castor oil derivative slip agent constitutes from 1 to 6 wt % of the solids content of electrostatic ink composition;
forming a latent electrostatic image on a surface;
contacting the surface with the electrostatic ink composition, such that at least some of the particles are transferred to the surface to form a developed toner image on the surface; and
transferring the toner image to the plastic substrate.

2. A method of printing according to claim 1, wherein the electrostatic ink composition further comprises a white colorant or lacks a colorant.

3. A method of printing according to claim 2, wherein the white colorant is present and is selected from $TiO_2$, calcium carbonate, zinc oxide, or mixtures thereof.

4. A method of printing according to claim 1, wherein plastic substrate comprises a sheet of plastic.

5. A method of printing according to claim 1, wherein the plastic substrate comprises a sheet of plastic for forming into or in the form of a shrink sleeve.

6. A method of printing according to claim 1, wherein the plastic substrate comprises a plastic selected from a polyalkylene, polyethylene terephthalate glycol, polystyrene, poly vinyl chloride, polyethylene-2,6-napthalate, polyhexamethylene adipamide, polymers of alpha mono-olefinically unsaturated hydrocarbons, vinyl acetate, methylacrylate, 2-ethyl hexyl acrylate, isoprene, butadiene acrylamide, ethylacrylate, or N-methyl-n-vinyl acetamide.

7. A method of printing according to claim 1, wherein the plastic substrate comprises a plastic selected from an oriented polypropylene or an oriented polyethylene.

8. A method of printing according to claim 1, wherein the castor oil derivative slip agent constitutes from 1 to 3 wt % of the solids content of the electrostatic ink composition.

9. A method of printing according to claim 1, wherein the providing of the electrostatic ink composition further comprises grinding the resin and the castor oil derivative slip agent.

10. A method of printing according to claim 9, wherein further additives are added to the electrostatic ink composition after grinding the resin and the castor oil derivative slip agent.

11. A method of printing according to claim 1, further comprising removing carrier liquid from the plastic substrate.

12. A method of printing according to claim 1, wherein the carrier liquid comprises an isoparaffinic compound.

13. A method of printing according to claim 1, wherein the castor oil derivative slip agent has a molecular weight from about 900 g/mol to about 960 g/mol.

14. A method of printing according to claim 1, wherein the castor oil derivative slip agent has a melting point from about 80° C. to about 95° C.

15. A method of printing on a plastic substrate, the method comprising
providing an electrostatic ink composition comprising a carrier liquid and particles, wherein the particles comprise both a resin and a castor oil derivative slip agent together in the same particles, wherein the particles are dispersed in the carrier liquid, wherein the castor oil derivative slip agent has a molecular weight from about 900 g/mol to about 960 g/mol;
forming a latent electrostatic image on a surface;
contacting the surface with the electrostatic ink composition, such that at least some of the particles are transferred to the surface to form a developed toner image on the surface; and
transferring the toner image to the plastic substrate.

16. A method of printing according to claim 15, wherein the electrostatic ink composition further comprises a white colorant or lacks a colorant.

17. A method of printing according to claim 15, wherein the providing of the electrostatic ink composition further comprises grinding the resin and the castor oil derivative slip agent.

18. A method of printing on a plastic substrate, the method comprising
providing an electrostatic ink composition comprising a carrier liquid and particles, wherein the particles comprise both a resin and a castor oil derivative slip agent together in the same particles, wherein the particles are dispersed in the carrier liquid, wherein the castor oil derivative slip agent has a melting point from about 80° C. to about 95° C.;
forming a latent electrostatic image on a surface;
contacting the surface with the electrostatic ink composition, such that at least some of the particles are transferred to the surface to form a developed toner image on the surface; and
transferring the toner image to the plastic substrate.

19. A method of printing according to claim 18, wherein the electrostatic ink composition further comprises a white colorant or lacks a colorant.

20. A method of printing according to claim 18, wherein the providing of the electrostatic ink composition further comprises grinding the resin and the castor oil derivative slip agent.

* * * * *